Oct. 16, 1928.
W. E. EDGETT
1,687,931
HEATER CONNECTION
Filed Nov. 16, 1922
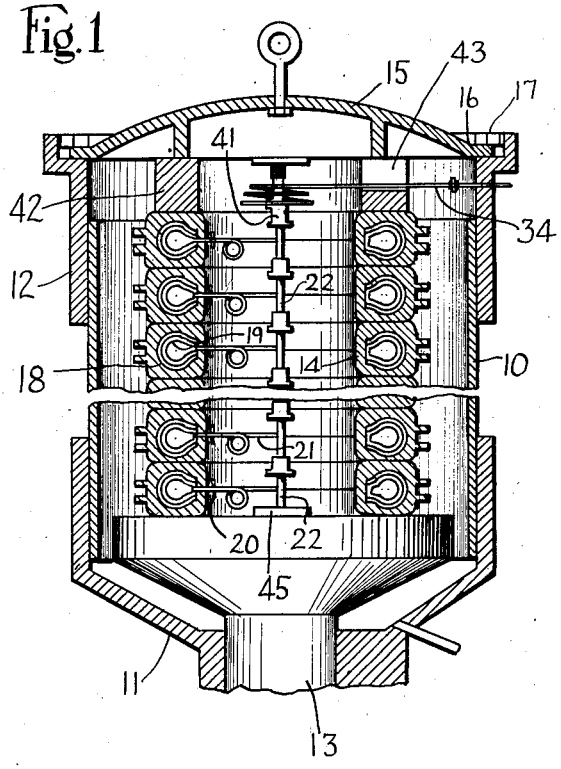
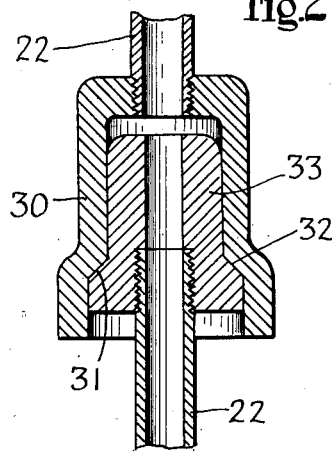
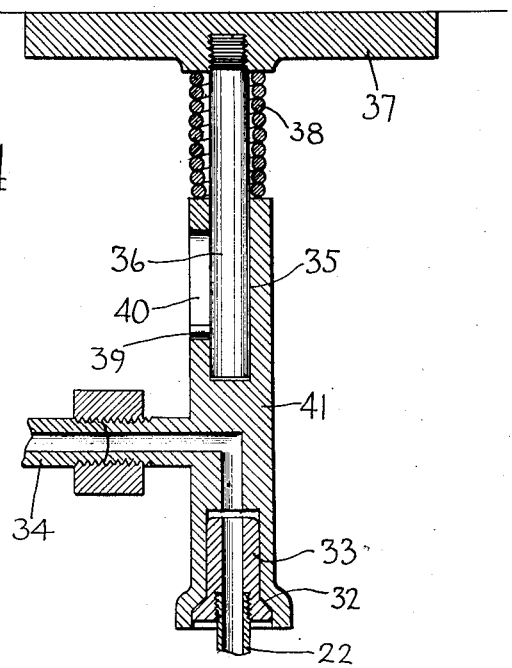
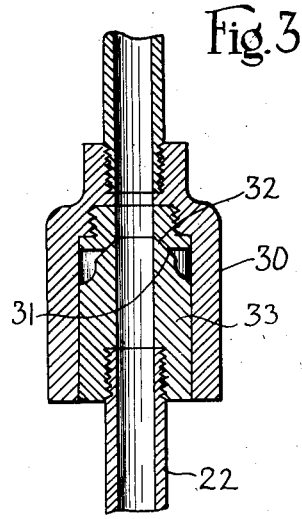
INVENTOR
William E. Edgett
BY
ATTORNEY Patented Oct. 16, 1928.

1,687,931

UNITED STATES PATENT OFFICE.

WILLIAM E. EDGETT, OF INDIAN ORCHARD, MASSACHUSETTS, ASSIGNOR TO THE FISK RUBBER COMPANY, OF CHICOPEE FALLS, MASSACHUSETTS, A CORPORATION OF MASSACHUSETTS.

HEATER CONNECTION.

Application filed November 16, 1922. Serial No. 601,217.

The present invention relates to connections adapted for supplying fluid under pressure to the interior of a plurality of tire casings mounted in a vulcanizing heater. It has for its object the elimination of time consumed in tightening other forms of connections, and the simplification and general improvement of the connections themselves.

The invention will now be described in connection with the accompanying drawings, in which Fig. 1 is a vertical section, partially broken away to save space, of a heater for vulcanizing tire casings in which the invention is applied;

Fig. 2 is a detail section of the joint between two adjacent sections of the heater manifold;

Fig. 3 is a similar detail of a modification; and

Fig. 4 is a detail section of the top unit of the manifold.

For illustration a vulcanizing press of one standard type has been shown, this form being one used for vulcanizing tire casings. A cylindrical shell 10 forms the body of the heater, being fitted to a base 11 and carrying a top piece 12. Through the base passes a hydraulic ram 13, operated in a customary manner which need not be described here, and functioning to support a stack of molds 14 and press them against a cover 15. This cover has lugs 16 adapted to fit under lugs 17 on the top piece when the cover is rotated, whereby it is held in position to withstand the pressure of the hydraulic ram. In the curing of certain types of tires it is customary to force the tire 18 outwardly against the mold by fluid pressure exerted either directly against the tire or through an expansible bag 19. Through valve stems 20 the bags are connected to so-called pigtails or short flexible pipes 21 forming part of manifold sections 22. Customarily these sections are connected together either by a threaded union or by a lever mechanism serving to draw them together.

By the present invention the necessity of separately tightening these sections together is dispensed with; and they are simply stacked one on top of the other, leaving the tightening of the joints to be done by the movement of the hydraulic ram. A simple form of connection is shown in Fig. 2. One section 22 has at its bottom a bell-shaped member 30, having a beveled seat 31 against which fits a beveled seat 32 on an apertured plug 33 attached to the top of the next lower section 22. The body of plug 33 fitting into member 30 serves as a guide for aligning the two parts, and the mating seats 31 and 32 present a fluid tight connection when pressed together. As the molds are stacked in the heater additional manifold sections are added, no tightening being done until the complete stack is in place.

Over the plug 33 of the top manifold section 22 is slipped a bell-mouthed member 41 with a beveled seat 32, having a connection with a pipe 34 leading to a suitable outside source of fluid pressure, and a hole 35 in which slides a plunger 36 carrying a head 37. A spring 38 serves to press the head yieldingly upwards, undue movement being restricted by a pin 39 on the plunger running in a slot 40 in member 41. The bottom of the manifold sections has a base 45 adapted to rest on the top of the ram 13.

In operation, after the desired number of molds have been stacked one on top of the other, and the connections loosely assembled, the member 41 is put in place. Usually, in order to protect pipe 34, a ring 42 having a radial groove 43 is placed on top of the stack of molds. The member 41 is of such dimensions that the head 37 will extend above the ring. When the hydraulic ram is raised the head will abut against the cover 15, compressing the spring until the ring 42 hits against the cover. This compression of the spring will simultaneously tighten all the couplings, and will hold them in this tightened condition until the pressure of the ram is released.

In Fig. 3 a modified form of connection is shown, differing from that previously described in that the interfitting seats are better protected from injury. The same reference numerals have been used as previously, as the parts perform the same functions, the chief difference being that the seat 32 is made removable and is positioned further inside the bell-shaped member 30, so that the plug will be in full alignment with the member before the seats 31 and 32 can meet.

Having thus described my invention, I claim:

1. A sectional manifold for use in a vulcanizing press comprising a series of loosely assembled sections adapted to rest on one member of the press, the uppermost section being connected to a source of fluid pressure and provided with a yielding member positioned to engage the other press member upon closing of the press to force the sections into fluid tight relation.

2. A sectional manifold for use in a vulcanizing press comprising a series of loosely assembled sections adapted to rest on one member of the press, means adapted to connect the several lower sections to articles in the press, means connecting the uppermost section to a source of fluid pressure and yielding means carried by the said upper section to engage the under surface of the other press member upon closing of the press to force the sections into fluid tight relation.

3. A sectional manifold for use in a vulcanizing press comprising a series of loosely assembled sections adapted to rest on one member of the press, the uppermost section being connected to a source of fluid pressure and provided with a yielding member adapted to freely engage the under surface of the other press member upon closing of the press to force the sections into fluid tight relation.

WILLIAM E. EDGETT.